United States Patent
Yeh

(10) Patent No.: US 11,861,079 B1
(45) Date of Patent: Jan. 2, 2024

(54) LUMINOUS TOUCH PAD MODULE

(71) Applicant: Primax Electronics Ltd., Taipei (TW)

(72) Inventor: Ming-Hui Yeh, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 18/121,973

(22) Filed: Mar. 15, 2023

(30) Foreign Application Priority Data

Jan. 18, 2023 (TW) ................. 112102373

(51) Int. Cl.
*G06F 3/0354* (2013.01)
*F21V 8/00* (2006.01)

(52) U.S. Cl.
CPC ....... *G06F 3/03547* (2013.01); *G02B 6/0068* (2013.01); *G02B 6/0076* (2013.01)

(58) Field of Classification Search
CPC .. G06F 3/03547; G06F 3/04883; G06F 1/169; G06F 3/04886; G06F 3/0488
USPC ................ 345/173–174; 178/18.01, 18.03
See application file for complete search history.

(56) References Cited

U.S. PATENT DOCUMENTS

| | | | |
|---|---|---|---|
| 8,363,007 B2 * | 1/2013 | Shih | G06F 3/03547 345/173 |
| 2010/0137033 A1 * | 6/2010 | Lee | G06F 1/1616 345/173 |

* cited by examiner

Primary Examiner — Koosha Sharifi-Tafreshi
(74) Attorney, Agent, or Firm — KIRTON McCONKIE; Evan R. Witt

(57) ABSTRACT

A luminous touch pad module includes a touch member, a touch sensing circuit board, a first light guide plate, a second light guide plate, a first light-emitting element, a first light-guiding element and a second light-emitting element. The touch member, the second light guide plate, the first light guide plate and the touch sensing circuit board are sequentially arranged from top to bottom. The first light-emitting element is aligned with the first light guide plate. The second light-emitting element is located under the touch sensing circuit board. The second light-emitting element is aligned with the first light-guiding element. A light beam emitted by the first light-emitting element is transmitted to the touch member through the first light guide plate. A light beam emitted by the second light-emitting element is transmitted to the touch member through the first light-guiding element and the second light guide plate sequentially.

15 Claims, 12 Drawing Sheets

LUMINOUS TOUCH PAD MODULE

FIELD OF THE INVENTION

The present invention relates to an input device, and more particularly to an input device with a touch control function.

BACKGROUND OF THE INVENTION

Nowadays, notebook computers become essential tools for modern people in their daily lives. The user can operate an external mouse device to control a notebook computer. In addition, the notebook computer is usually equipped with a touch pad module. The user can move a cursor or perform a clicking control operation through the touch pad module.

If the user forgets to carry an external mouse when the user goes out with a notebook computer, the user's finger may be placed on the touch pad module and slid on the touch pad module. Consequently, a cursor shown on a display screen of the notebook computer is correspondingly moved.

Conventionally, the touch pad can be touched or pressed to execute the corresponding function. With the advancement of the touch control technology and the backlight technology, the main body of the touch pad module has an illumination function. Furthermore, the touch pad module provides a built-in key input function. Due to the arrangement of the touch pad module, the notebook computer is additionally equipped with hot keys. More especially, the notebook computer additionally has a numeric keypad through the touch pad module. For example, when a specified position of the touch pad module is pressed down, a backlight module under the touch pad module is enabled, and plural numbers or symbols are displayed. At the same time, the regions of the touch pad module corresponding to the displayed numbers or symbols are changed to corresponding key regions. When one key region of the touch pad module is touched by the user, the function of inputting a corresponding digital number (or symbol), a Backspace function, an Enter function or an associated function is executed. Consequently, even if the notebook computer is not connected with an external numeric keypad, the notebook computer can provide the key input function quickly.

FIG. 1 is a schematic cross-sectional view illustrating the structure of a conventional luminous touch pad module. As shown in FIG. 1, the luminous touch pad module 1 comprises a touch member 11, a light guide plate 12, a touch sensing circuit board 13 and a light source 14.

The light guide plate 12 is arranged between the touch sensing circuit board 13 and the touch member 11. The light source 14 is located beside a side of the light guide plate 12. The light source 14 emits a light beam to the light guide plate 12. After the beam emitted by the light source 14 is transmitted through the light guide plate 12, the light beam is exited to the touch member 11 and outputted to the surroundings.

However, the structural design of the luminous touch pad module 1 still has some drawbacks. For example, the light source 14 needs to be individually located outside the stack structure of the luminous touch pad module 1. Consequently, it is necessary to additionally install a light-shading decorative plate 15 over the light source 14. The arrangement of the light-shading decorative plate 15 results in a non-functional area on the luminous touch pad module 1. Moreover, since the light source 14 is individually located outside the stack structure of the luminous touch pad module 1, it is difficult to design a bright light ring at the periphery region of the luminous touch pad module 1.

Therefore, there is a need of providing an improved luminous touch pad module in order to overcome the above drawbacks.

SUMMARY OF THE INVENTION

An object of the present invention provides a luminous touch pad module with a bright light ring structure. In addition, the luminous touch pad module can provide a multilayered luminous effect.

The other objects and advantages of the present invention will be understood from the disclosed technical features.

In accordance with an aspect of the present invention, a luminous touch pad module is provided. The luminous touch pad module includes a touch member, a touch sensing circuit board, a first light guide plate, a second light guide plate, at least one first light-emitting element, a first light-guiding element and at least one second light-emitting element. The touch sensing circuit board is located under the touch member. The first light guide plate is arranged between the touch member and the touch sensing circuit board. The second light guide plate is arranged between the touch member and the first light guide plate. The at least one first light-emitting element is located over the touch sensing circuit board. The at least one first light-emitting element is aligned with the first light guide plate. The first light-guiding element is arranged around the touch sensing circuit board, the first light guide plate, the second light guide plate and the at least one first light-emitting element. The at least one second light-emitting element is located under the touch sensing circuit board. The at least one second light-emitting element is aligned with the first light-guiding element. A light beam emitted by the at least one first light-emitting element is transmitted to the touch member through the first light guide plate. A light beam emitted by the at least one second light-emitting element is transmitted to the touch member through the first light-guiding element and the second light guide plate sequentially.

In an embodiment, the first light-guiding element includes a lateral wall and a bottom wall. The lateral wall of the first light-guiding element is arranged around the touch sensing circuit board, the first light guide plate, the second light guide plate and the at least one first light-emitting element. The bottom wall of the first light-guiding element is located under the touch sensing circuit board. The bottom wall of the first light-guiding element includes a first hollow portion. The lateral wall of the first light-guiding element is extended from an outer edge of the bottom wall of the first light-guiding element and extended in a direction toward the touch member. A first accommodation space is defined by the lateral wall and the bottom wall of the first light-guiding element collaboratively. The first accommodation space is in communication with the first hollow portion. The touch sensing circuit board, the first light guide plate, the second light guide plate and the at least one first light-emitting element are disposed within the first accommodation space. The at least one second light-emitting element is disposed within the first hollow portion. The at least one second light-emitting element is aligned with the bottom wall of the first light-guiding element.

In an embodiment, the luminous touch pad module further includes a second light-guiding element and at least one third light-emitting element. The second light-guiding element is arranged around the touch member and the first light-guiding element. The at least one third light-emitting element is located under the touch sensing circuit board. The at least one third light-emitting element is aligned with the second light-guiding element. A light beam emitted by the at least one third light-emitting element is transmitted to a position near an outer edge of the touch member through the second light-guiding element.

In an embodiment, the second light-guiding element includes a surrounding wall and a base plate. The surrounding wall of the second light-guiding element is arranged around the touch member and the first light-guiding element. The base plate of the second light-guiding element has a second hollow portion. The surrounding wall of the second light-guiding element is extended from an outer edge of the base plate and extended to the position near the outer edge of the touch member. A second accommodation space is defined by the surrounding wall and the base plate of the second light-guiding element collaboratively. The second accommodation space is in communication with the second hollow portion. The touch member, the touch sensing circuit board, the first light guide plate, the second light guide plate, the first light-guiding element, the at least one first light-emitting element and the at least one second light-emitting element are disposed within the second accommodation space. The at least one third light-emitting element is disposed within the second hollow portion and aligned with the base plate of the second light-guiding element.

In an embodiment, the touch sensing circuit board includes a first surface and a second surface, and the first surface and the second surface are opposed to each other. The first surface of the touch sensing circuit board is arranged between the first light guide plate and the second surface of the touch sensing circuit board. The at least one first light-emitting element is installed on the first surface of the touch sensing circuit board. The at least one second light-emitting element is installed on the second surface of the touch sensing circuit board. The at least one third light-emitting element is installed on the second surface of the touch sensing circuit board and located beside the at least one second light-emitting element.

In an embodiment, the luminous touch pad module further includes a light source circuit board. The light source circuit board is arranged between the first light-guiding element and the second light-guiding element. The light source circuit board includes a top surface and a bottom surface. The top surface and the bottom surface are opposed to each other. The top surface of the light source circuit board faces the first light-guiding element. The bottom surface of the light source circuit board faces the second light-guiding element. The at least one second light-emitting element is installed on the top surface of the light source circuit board. The at least one third light-emitting element is installed on the bottom surface of the light source circuit board. The at least one first light-emitting element is installed on the touch sensing circuit board.

In an embodiment, the luminous touch pad module further includes a light blocking structure. The light blocking structure is installed on the first light guide plate. The first light guide plate is divided into a first light-guiding part and a second light-guiding part by the light blocking structure. The at least one first light-emitting element includes plural first light-emitting elements. At least one of the plural first light-emitting elements is aligned with the first light-guiding part of the first light guide plate. The others of the plural first light-emitting elements are aligned with the second light-guiding part of the first light guide plate.

In accordance with another aspect of the present invention, a luminous touch pad module is provided. The luminous touch pad module includes a touch member, a printed circuit board, a first light guide plate, a second light guide plate, a flexible touch sensing circuit board, at least one first light-emitting element, a first light-guiding element and at least one second light-emitting element. The printed circuit board is located under the touch member. The first light guide plate is arranged between the touch member and the printed circuit board. The second light guide plate is arranged between the touch member and the first light guide plate. The flexible touch sensing circuit board is arranged between the touch member and the second light guide plate. The flexible touch sensing circuit board is electrically connected with the printed circuit board. The at least one first light-emitting element is located over the printed circuit board. The at least one first light-emitting element is aligned with the first light guide plate. The first light-guiding element is arranged around the printed circuit board, the first light guide plate, the second light guide plate and the at least one first light-emitting element. The at least one second light-emitting element is located under the printed circuit board. The at least one second light-emitting element is aligned with the first light-guiding element. A light beam emitted by the at least one first light-emitting element is transmitted to the touch member through the first light guide plate. A light beam emitted by the at least one second light-emitting element is transmitted to the touch member through the first light-guiding element and the second light guide plate sequentially.

In an embodiment, the first light-guiding element includes a lateral wall and a bottom wall. The lateral wall of the first light-guiding element is arranged around the printed circuit board, the first light guide plate, the second light guide plate and the at least one first light-emitting element. The bottom wall of the first light-guiding element is located under the printed circuit board. The bottom wall of the first light-guiding element includes a first hollow portion. The lateral wall of the first light-guiding element is extended from an outer edge of the bottom wall of the first light-guiding element and extended in a direction toward the touch member. A first accommodation space is defined by the lateral wall and the bottom wall of the first light-guiding element collaboratively. The first accommodation space is in communication with the first hollow portion. The printed circuit board, the first light guide plate and the second light guide plate are disposed within the first accommodation space. The at least one second light-emitting element is disposed within the first hollow portion and aligned with the bottom wall of the first light-guiding element.

In an embodiment, the luminous touch pad module further includes a second light-guiding element and at least one third light-emitting element. The second light-guiding element is arranged around the touch member, the first light-guiding element and the flexible touch sensing circuit board. The at least one third light-emitting element is located under the printed circuit board. The at least one third light-emitting element is aligned with the second light-guiding element. A light beam emitted by the at least one third light-emitting element is transmitted to a position near an outer edge of the touch member through the second light-guiding element.

In an embodiment, the second light-guiding element includes a surrounding wall and a base plate. The surrounding wall of the second light-guiding element is arranged around the touch member the first light-guiding element and the flexible touch sensing circuit board. The base plate of the second light-guiding element has a second hollow portion. The surrounding wall of the second light-guiding element is extended from an outer edge of the base plate and extended to the position near the outer edge of the touch member. A second accommodation space is defined by the surrounding wall and the base plate of the second light-guiding element collaboratively. The second accommodation space is in communication with the second hollow portion. The touch member, the printed circuit board, the first light guide plate, the second light guide plate, the first light-guiding element, the flexible touch sensing circuit board, the at least one first light-emitting element and the at least one second light-emitting element are disposed within the second accommodation space. The at least one third light-emitting element is disposed within the second hollow portion and aligned with the base plate of the second light-guiding element.

In an embodiment, the printed circuit board includes a top surface and a bottom surface, and the top surface and the bottom surface are opposed to each other. The top surface of the printed circuit board is arranged between the first light guide plate and the bottom surface of the printed circuit board. The at least one first light-emitting element is installed on the top surface of the printed circuit board. The at least one second light-emitting element is installed on the bottom surface of the printed circuit board. The at least one third light-emitting element is installed on the bottom surface of the printed circuit board and located beside the at least one second light-emitting element.

In an embodiment, the luminous touch pad module further includes a light source circuit board. The light source circuit board is arranged between the first light-guiding element and the second light-guiding element. The light source circuit board includes a top surface and a bottom surface. The top surface and the bottom surface are opposed to each other. The top surface of the light source circuit board faces the first light-guiding element. The bottom surface of the light source circuit board faces the second light-guiding element. The at least one second light-emitting element is installed on the top surface of the light source circuit board. The at least one third light-emitting element is installed on the bottom surface of the light source circuit board. The at least one first light-emitting element is installed on the printed circuit board.

In an embodiment, the luminous touch pad module further includes an electrical connector. The electrical connector is located under the printed circuit board. The flexible sensing circuit board is electrically connected with the printed circuit board through the electrical connector.

In an embodiment, the flexible touch sensing circuit board is made of a light-transmissible material.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
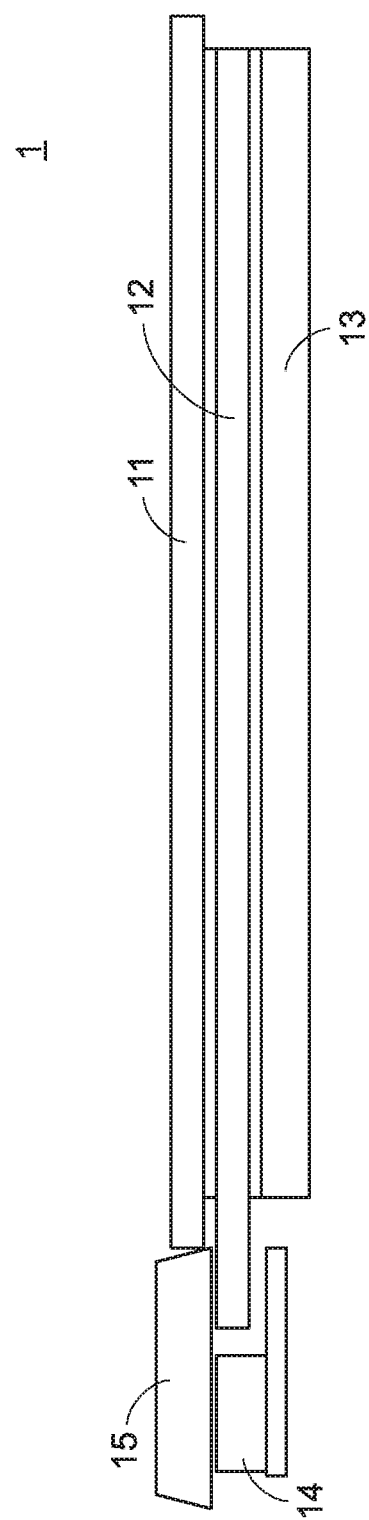
FIG. 1 is a schematic cross-sectional view illustrating the structure of a conventional luminous touch pad module.
Figure 2:
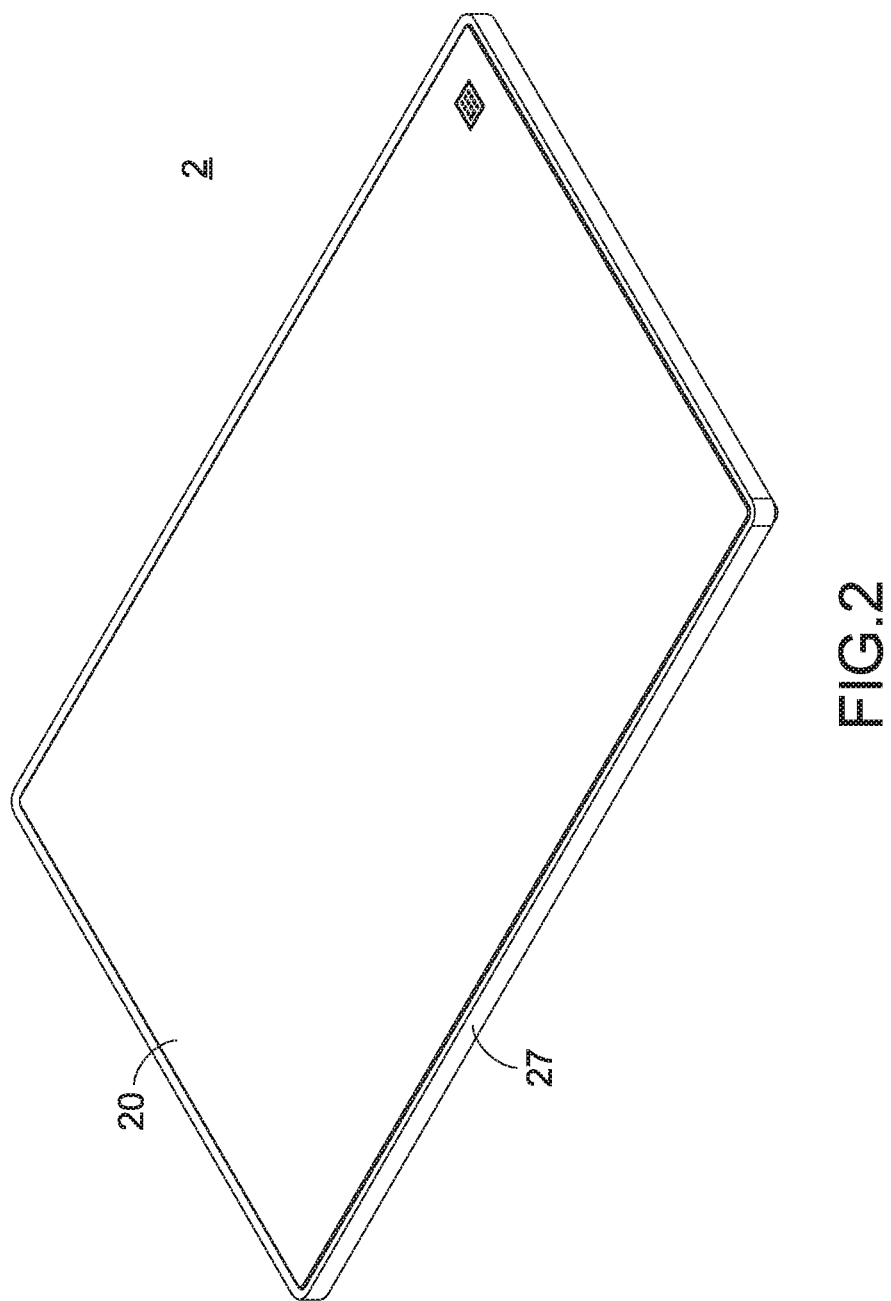
FIG. 2 is a schematic perspective view illustrating the appearance of a luminous touch pad module according to a first embodiment of the present invention.
Figure 3:
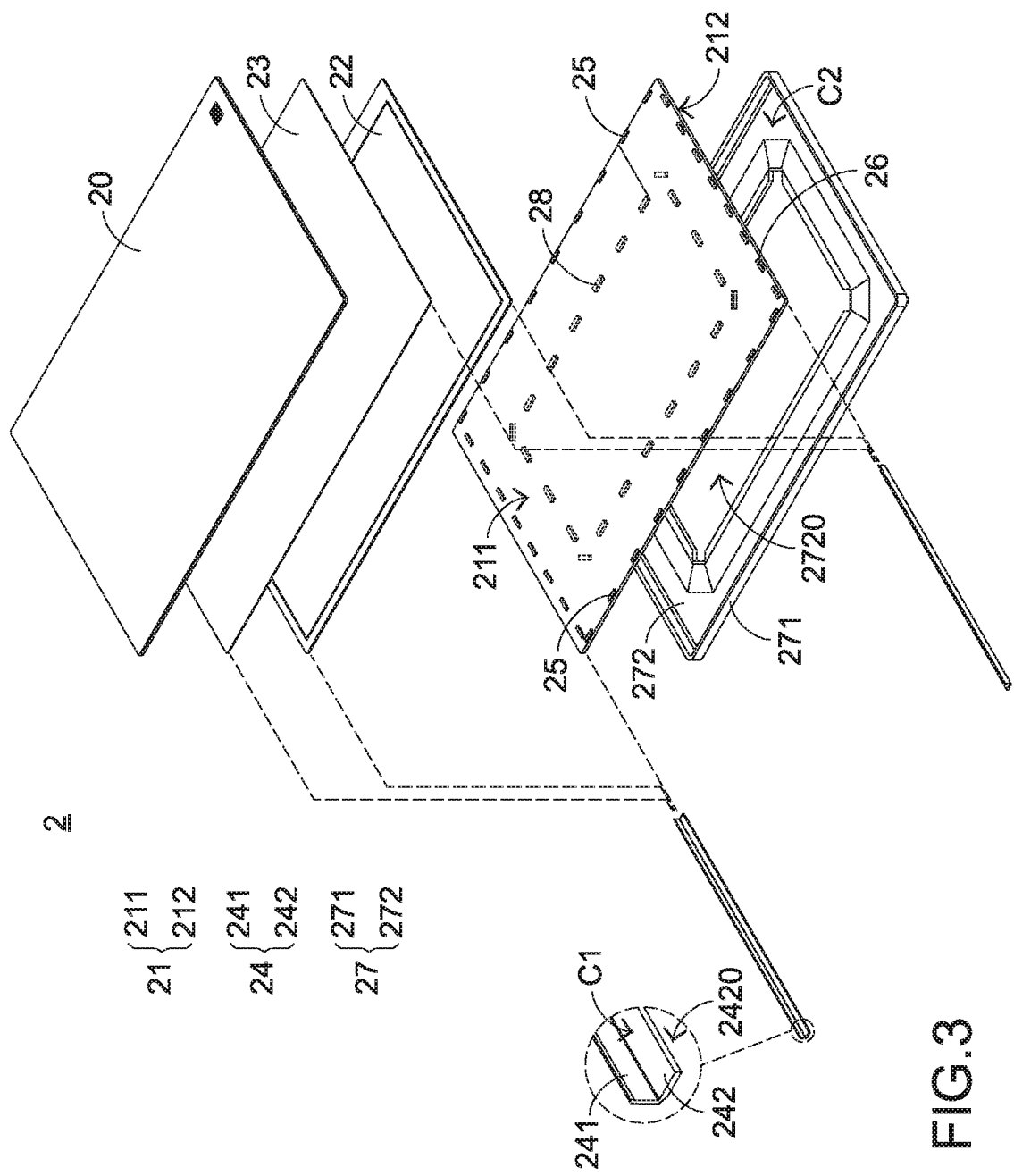
FIG. 3 is a schematic exploded view illustrating the luminous touch pad module as shown in FIG. 2.
Figure 4:
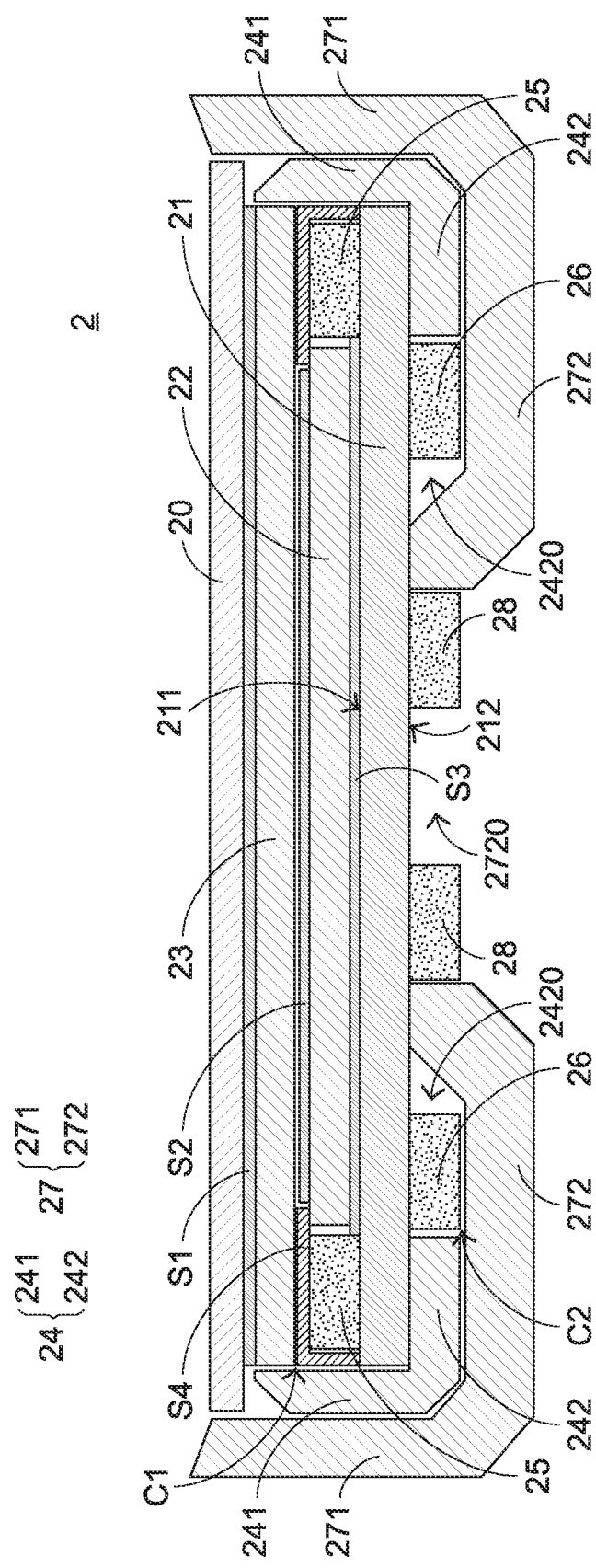
FIG. 4 is a schematic cross-sectional view illustrating the stack structure of the luminous touch pad module as shown in FIG. 3.

Please refer to FIGS. 2, 3 and 4. FIG. 2 is a schematic perspective view illustrating the appearance of a luminous touch pad module according to a first embodiment of the present invention. FIG. 3 is a schematic exploded view illustrating the luminous touch pad module as shown in FIG. 2. FIG. 4 is a schematic cross-sectional view illustrating the stack structure of the luminous touch pad module as shown in FIG. 3.

As shown in FIGS. 2, 3 and 4, the luminous touch pad module 2 is a multifunctional touch pad module that is a combination of a touch panel and a backlight module. The luminous touch pad module 2 is installed in a fixing frame of a bottom housing of a notebook computer. The luminous touch pad module 2 is electrically connected with a processor of the notebook computer. At least a portion of the luminous touch pad module 2 is exposed outside so as to be touched by the user's finger. Consequently, the notebook computer can be operated by the user. In a general usage mode, the luminous touch pad module 2 is not illuminated. Under this circumstance, the operations of the luminous touch pad module 2 are similar to those of the general touch panel. When the user's finger is placed on the luminous touch pad module 2 and slid on the luminous touch pad module 2, a mouse cursor is correspondingly moved. Moreover, in case that the luminous touch pad module 2 is pressed down by the user's finger, the notebook computer executes a specific function. In a luminous usage mode, specific patterns, characters or symbols are displayed on the luminous touch pad module 2. For example, a virtual numeric keypad is displayed on the luminous touch pad module 2. According to the touch signal from the luminous touch pad module 2, the processor of the notebook computer performs the operation corresponding to the pressed number or symbol.

The other structures of the luminous touch pad module 2 will be described in more details as follows.

Please refer to FIGS. 2, 3 and 4 again. In an embodiment, the luminous touch pad module 2 comprises a touch member 20, a touch sensing circuit board 21, a first light guide plate 22, a second light guide plate 23, a first light-guiding element 24, at least one first light-emitting element 25 and at least one second light-emitting element 26.

The touch sensing circuit board 21 is located under the touch member 20. The first light guide plate 22 is arranged between the touch member 20 and the touch sensing circuit board 21. The second light guide plate 23 is arranged between the touch member 20 and the first light guide plate 22. The first light guide plate 22 is arranged between the second light guide plate 23 and the touch sensing circuit board 21. The at least one first light-emitting element 25 is installed on a top side of the touch sensing circuit board 21. In addition, the first light-emitting element 25 is aligned with the first light guide plate 22. The at least one second light-emitting element 26 is located under the touch sensing circuit board 21. In addition, the at least one second light-emitting element 26 is aligned with the first light-guiding element 24. The at least one first light-guiding element 24 is arranged around the touch sensing circuit board 21, the first light guide plate 22, the second light guide plate 23 and the at least one first light-emitting element 25.

Preferably but not exclusively, the touch member 20 is made of glass or any other appropriate material. The material of the touch member may be varied according to the practical requirements. In this embodiment, a first adhesive layer S1 is arranged between the touch member and the second light guide plate 23. The touch member 20 and the second light guide plate 23 are combined together through the first adhesive layer S1. A second adhesive layer S2 is arranged between the second light guide plate 23 and the first light guide plate 22. The second light guide plate 23 and the first light guide plate 22 are combined together through the second adhesive layer S2. A third adhesive layer S3 is arranged between the first light guide plate 22 and the touch sensing circuit board 21. The first light guide plate 21 and the touch sensing circuit board 21 are combined together through the third adhesive layer S3. Preferably but not exclusively, each of the first adhesive layer S1, the second adhesive layer S2 and the third adhesive layer S3 is a pressure sensitive adhesive (PSA). It is noted that the examples of the first adhesive layer S1, the second adhesive layer S2 and the third adhesive layer S3 are not restricted.

Please refer to FIGS. 2, 3 and 4 again. In an embodiment, the first light-guiding element 24 comprises a lateral wall 241 and a bottom wall 242. The lateral wall 241 of the first light-guiding element 24 is arranged around the touch sensing circuit board 21, the first light guide plate 22, the second light guide plate 23 and the at least one first light-emitting element 25. The bottom wall 242 is located under the touch sensing circuit board 21. In addition, the bottom wall 242 comprises a first hollow portion 2420. The lateral wall 241 is extended from the outer edge of the bottom wall 242 and extended in the direction toward the touch member 20. A first accommodation space C1 is defined by the lateral wall 241 and the bottom wall 242 of the first light-guiding element 24 collaboratively. In addition, the first accommodation space C1 is in communication with the first hollow portion 2420. The touch sensing circuit board 21, the first light guide plate 22, the second light guide plate 23 and the at least one first light-emitting element 25 are disposed within the first accommodation space C1. In addition, the at least one second light-emitting element 26 is disposed within the first hollow portion 2420 and aligned with the bottom wall 242 of the first light-guiding element 24. In this embodiment, the cross section of the lateral wall 241 and the bottom wall 242 of the first light-guiding element 24 is L-shaped. It is noted that the shape of the cross section of the lateral wall 241 and the bottom wall 242 of the first light-guiding element 24 is not restricted.

In this embodiment, the lateral wall 241 of the first light-guiding element 24 is arranged around a portion of the touch sensing circuit board 21, a portion of the first light guide plate 22, a portion of the second light guide plate 23 and a portion of the first light-emitting element 25. When the touch sensing circuit board 21, the first light guide plate 22, the second light guide plate 23 and the at least one first light-emitting element 25 are stacked on each other and formed as a stack structure, the lateral wall 241 of the light guiding element 24 is arranged around two opposite lateral sides of the stack structure. It is noted that numerous modifications and alterations may be made while retaining the teachings of the invention. For example, in another embodiment, the lateral wall 241 of the first light-guiding element 241 is arranged around all lateral sides of the stack structure.

Please refer to FIGS. 2, 3 and 4 again. In an embodiment, the luminous touch pad module 2 further comprises second light-guiding element 27 and at least one third light-emitting element 28. The second light-guiding element 27 is arranged around the touch member 20 and the first light-guiding element 24. The at least one third light-emitting element 28 is located under the touch sensing circuit board 21. In addition, the at least one third light-emitting element 28 is aligned with the second light-guiding element 27. The light beam emitted by the at least one third light-emitting element 28 is transmitted to a position near the outer edge of the touch member 20 through the second light-guiding element 27.

Please refer to FIGS. 2, 3 and 4 again. In this embodiment, the second light-guiding element 27 comprises a surrounding wall 271 and a base plate 272. The surrounding wall 271 of the second light-guiding element 27 is arranged around the touch member 20 and the first light-guiding element 24. The base plate 272 has a second hollow portion 2720. The surrounding wall 271 of the second light-guiding element 27 is extended from the outer edge of the base plate 272 and extended in a direction toward a position near the touch member 20. A second accommodation space C2 is defined by the surrounding wall 271 and the base plate 272 collaboratively. In addition, the second accommodation space C2 is in communication with the second hollow portion 2720. The touch member 20, the touch sensing circuit board 21, the first light guide plate 22, the second light guide plate 23, the first light-guiding element 24, the at least one first light-emitting element 25 and the at least one second light-emitting element 26 are disposed within the second accommodation space C2, which is defined by the surrounding wall 271 and the base plate 272 collaboratively. The at least one third light-emitting element 28 is disposed within the second hollow portion 2720 and aligned with the base plate 272. In this embodiment, the cross section of the surrounding wall 271 and the base plate 272 of the second light-guiding element 27 is L-shaped. It is noted that the cross section of the surrounding wall 271 and the base plate 272 of the second light-guiding element 27 is not restricted.

In this embodiment, the light beam emitted by the at least one first light-emitting element 25 is transmitted to the touch member 20 through the first light guide plate 22. After the touch member 20 is illuminated by the light beam from the at least one first light-emitting element 25, a virtual numeric keypad with specific patterns, words or symbols can be displayed on the luminous touch pad module 2. In this embodiment, the light beam from the at least one second light-emitting element 26 is transmitted to the touch member 20 through the bottom wall 242 of the first light-guiding element 24, the lateral wall 241 of the first light-guiding element 24 and the second light guide plate 23 sequentially. In this embodiment, the light beam from the at least one third light-emitting element 28 is transmitted to the position near the outer edge of the touch member 20 through the base plate 272 of the second light-guiding element 27 and the surrounding wall 271 of the second light-guiding element 27 sequentially. Consequently, a bright light ring can be created at the periphery region of the luminous touch pad module 2. In this embodiment, the luminous touch pad module 2 further comprises a light-shading layer S4. The light-shading layer S4 is located over the at least first one light-emitting element 25. Due to the arrangement of the light-shading layer S4, the light beam from the at least one first light-emitting element 25 is blocked by the light-shading layer S4. Since the light beam from the at least one first light-emitting element 25 is not directly irradiated on the second light guide plate 23, any local region of the second light guide plate 23 will not be too bright.

Please refer to FIGS. 2, 3 and 4 again. In this embodiment, the touch sensing circuit board 21 comprises a first surface 211 and a second surface 212. The first surface 211 and the second surface 212 are opposed to each other. The first surface 211 of the touch sensing circuit board 21 is arranged between the first light guide plate 22 and the second surface 212 of the touch sensing circuit board 21. In this embodiment, the at least one first light-emitting element 25 is installed on the first surface 211 of the touch sensing circuit board 21. In addition, the at least one first light-emitting element 25 is electrically connected with the touch sensing circuit board 21. The at least one second light-emitting element 26 is installed on the second surface 212 of the touch sensing circuit board 21. In addition, the at least one second light-emitting element 26 is electrically connected with the touch sensing circuit board 21. The at least one third light-emitting element 28 is installed on the second surface 212 of the touch sensing circuit board 21. In addition, the at least one third light-emitting element 28 is electrically connected with the touch sensing circuit board 21. Moreover, the at least one third light-emitting element 28 is located beside a side of the at least one second light-emitting element 26.

In this embodiment, the at least one first light-emitting element 25 includes plural first light-emitting elements 25. In addition, the plural first light-emitting elements 25 are installed on two opposite sides of the first surface 211 of the touch sensing circuit board 21. Similarly, the at least one second light-emitting element 26 includes plural second light-emitting element 26. In addition, the plural second light-emitting elements 26 are installed on two opposite sides of the second surface 212 of the touch sensing circuit board 21. Similarly, the at least one third light-emitting element 28 includes plural third light-emitting elements 28. In addition, the plural third light-emitting elements 28 are installed on the second surface 212 of the touch sensing circuit board 21. Especially, the plural third light-emitting elements 28 are installed on the second surface 212 of the touch sensing circuit board 21 and aligned with the second hollow portion 2720 of the base plate 272 of the second light-guiding element 27. It is noted that the numbers and the locations of the at least one first light-emitting element 25, the at least one second light-emitting element 26 and the at least one third light-emitting element 28 are not restricted. That is, the numbers and the locations of the at least one first light-emitting element 25, the at least one second light-emitting element 26 and the at least one third light-emitting element 28 may be varied according to the practical requirements. Preferably but not exclusively, the first light-emitting elements 25, the second light-emitting elements 26 and the third light-emitting element 28 are polychromatic light emitting diodes or monochromatic light emitting diodes.

Figure 5:
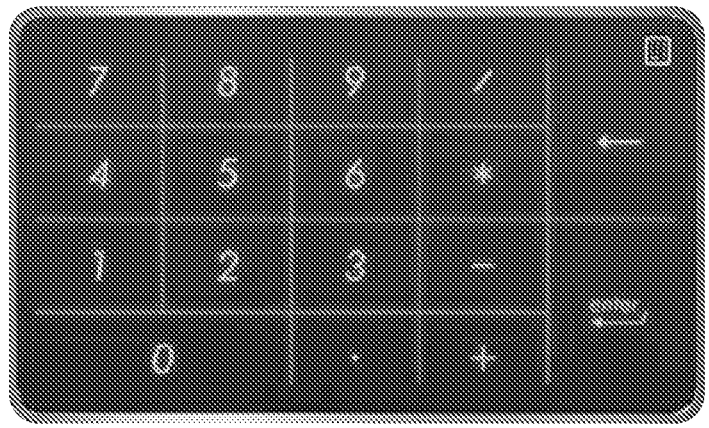
FIG. 5 schematically illustrates a usage scenario of the luminous touch pad module according to the first embodiment of the present invention.
Figure 6:
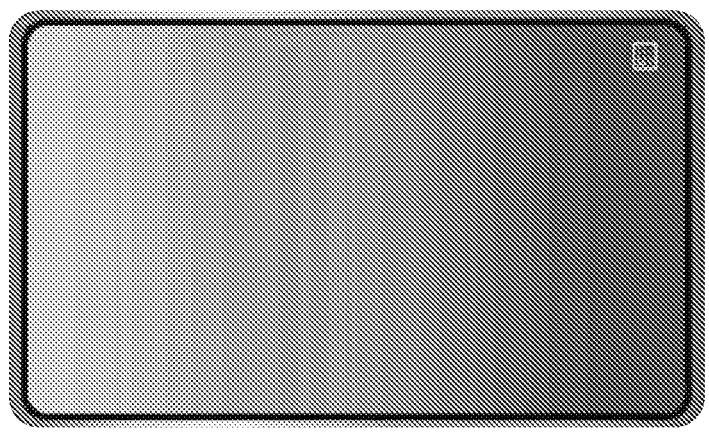
FIG. 6 schematically illustrates another usage scenario of the luminous touch pad module according to the first embodiment of the present invention.

FIG. 5 schematically illustrates a usage scenario of the luminous touch pad module according to the first embodiment of the present invention. FIG. 6 schematically illustrates another usage scenario of the luminous touch pad module according to the first embodiment of the present invention.

Please refer to FIG. 5. The user may operate the notebook computer to drive the at least one first light-emitting element 25 and the at least one third light-emitting element 28 to emit light beams. In this embodiment, the light beam emitted by the at least one first light-emitting element 25 is transmitted to the touch member 20 through the first light guide plate 22. Consequently, a virtual numeric keypad with specific patterns, words or symbols can be displayed on the luminous touch pad module 2. The light beam from the at least one third light-emitting element 28 is transmitted to the position near the outer edge of the touch member 20 through the base plate 272 of the second light-guiding element 27 and the surrounding wall 271 of the second light-guiding element 27 sequentially. Consequently, as shown in FIG. 5, a bright light ring surrounding the periphery region of the virtual numeric keypad can be displayed on the luminous touch pad module 2.

Please refer to FIG. 6. The user may operate the notebook computer to drive the at least one second light-emitting element 26 and the at least one third light-emitting element 28 to emit light beams. The light beam from the at least one second light-emitting element 26 is transmitted to the touch member 20 through the bottom wall 242 of the first light-guiding element 24, the lateral wall 241 of the first light-guiding element 24 and the second light guide plate 23 sequentially. Similarly, the light beam from the at least one third light-emitting element 28 is transmitted to the position near the outer edge of the touch member 20 through the base plate 272 of the second light-guiding element 27 and the surrounding wall 271 of the second light-guiding element 27 sequentially. Consequently, as shown in FIG. 6, the luminous touch pad module 2 can provide a multilayered luminous effect.

In this embodiment, due to the cooperation of the first light guide plate 22 and the at least one first light-emitting element 25, the cooperation of the first light-guiding element 24, the second light guide plate 23 and the at least one second light-emitting element 26 and the cooperation of the second light-guiding element 27 and the at least one third light-emitting element 28, a bright light ring surrounding the periphery region of the virtual numeric keypad can be displayed on the luminous touch pad module 2 (i.e., in the situation of FIG. 5), or a multilayered luminous effect can be provided (i.e., in the situation of FIG. 6).

It is noted that numerous modifications and alterations may be made while retaining the teachings of the invention. For example, in some other embodiments, the second light-guiding element 27 and the at least one third light-emitting element 28 are omitted. Due to the cooperation of the first light guide plate 22 and the at least one first light-emitting element 25 and the cooperation of the first light-guiding element 24, the second light guide plate 23 and the at least one second light-emitting element 26, a bright light ring surrounding the periphery region of the virtual numeric keypad can be displayed on the luminous touch pad module 2 (i.e., in the situation of FIG. 5), or a multilayered luminous effect can be provided (i.e., in the situation of FIG. 6).

Figure 7:
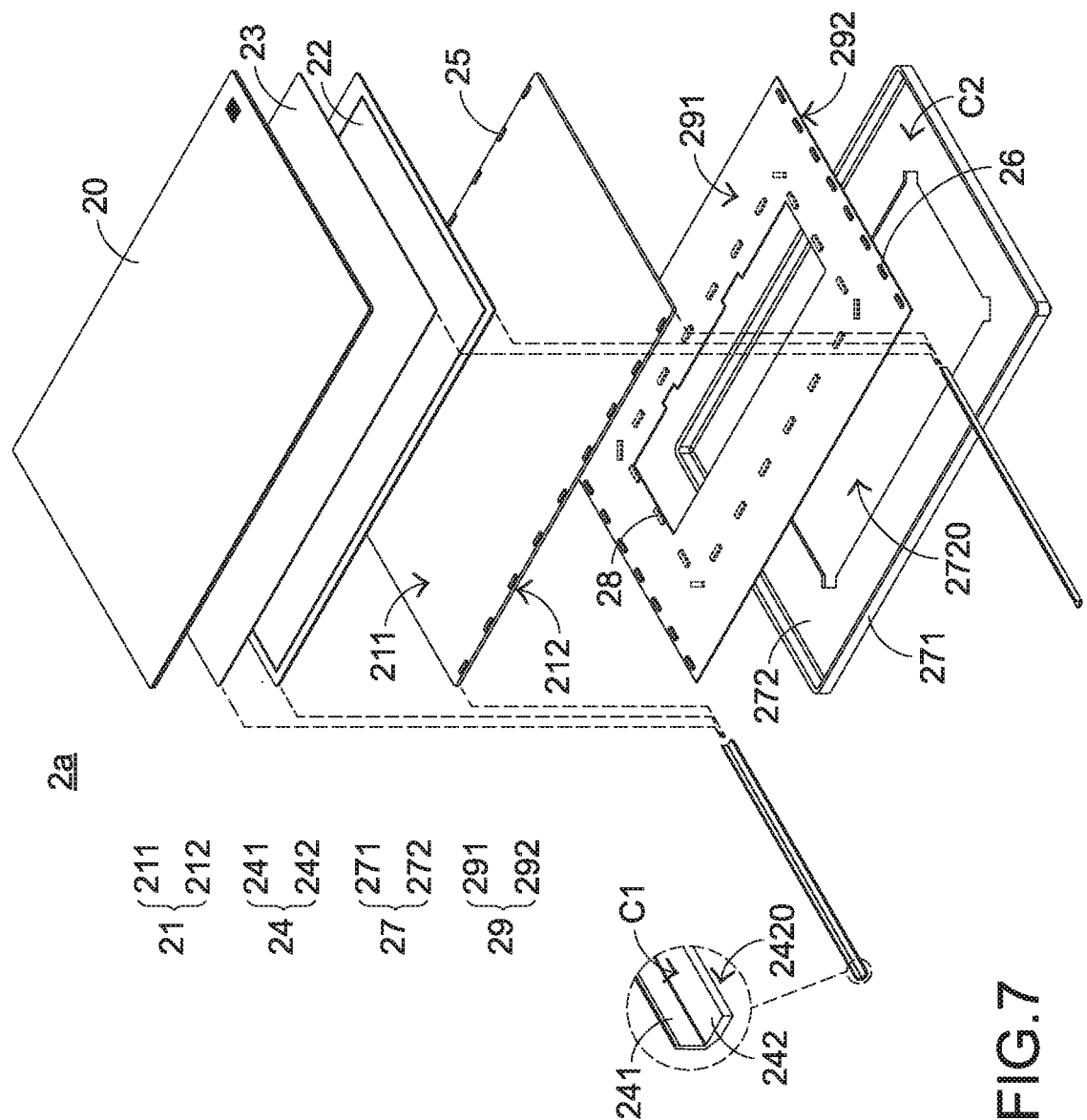
FIG. 7 is a schematic exploded view illustrating the luminous touch pad module according to a second embodiment of the present invention.
Figure 8:
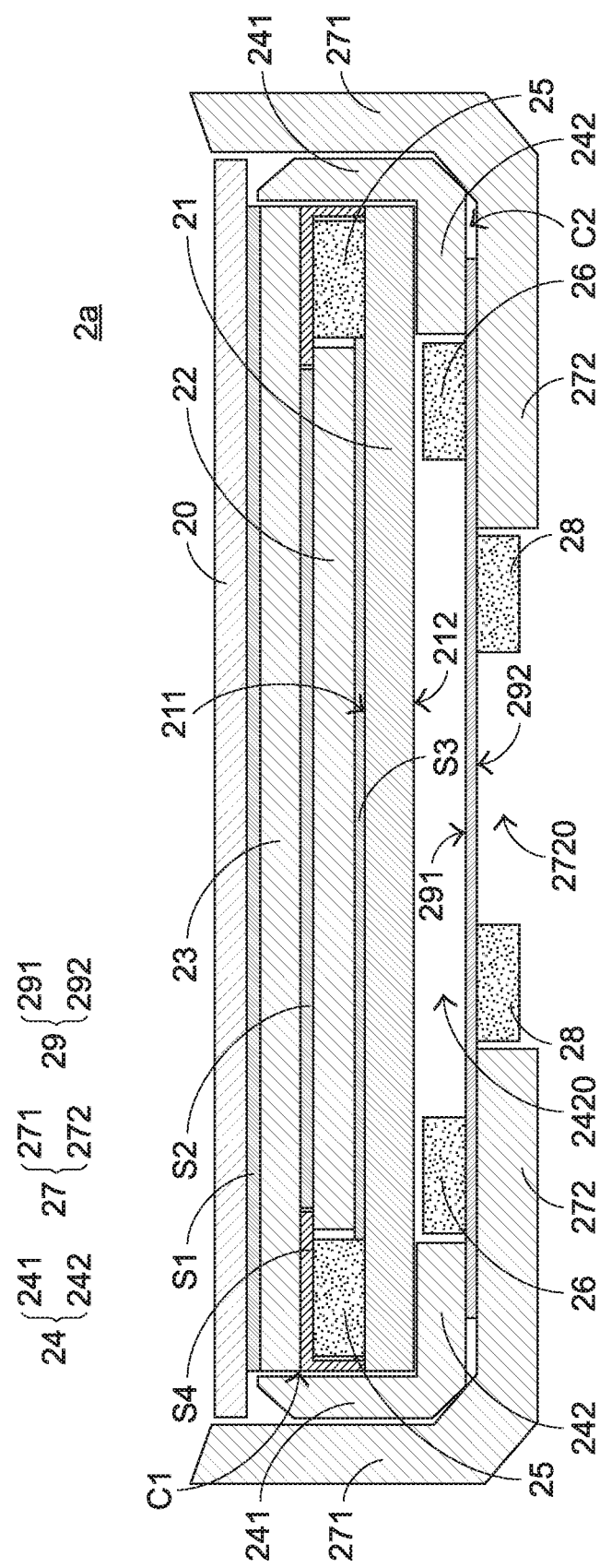
FIG. 8 is a schematic cross-sectional view illustrating the stack structure of the luminous touch pad module as shown in FIG. 7.

FIG. 7 is a schematic exploded view illustrating the luminous touch pad module according to a second embodiment of the present invention. FIG. 8 is a schematic cross-sectional view illustrating the stack structure of the luminous touch pad module as shown in FIG. 7.

The structures of the luminous touch pad module 2a of this embodiment are similar to the structures of the luminous touch pad module 2 as shown in FIGS. 2, 3 and 4. In comparison with the luminous touch pad module 2, the luminous touch pad module 2a of this embodiment further comprises a light source circuit board 29. The at least one second light-emitting element 26 and the at least one third light-emitting element 28 are supported by the light source circuit board 29. The light source circuit board 29 is arranged between the first light-guiding element 24 and the second light-guiding element 27. That is, the light source circuit board 29 is arranged between the bottom wall 242 of the first light-guiding element 24 and the base plate 272 of the second light-guiding element 27. The light source circuit board 29 comprises a top surface 291 and a bottom surface 292. The top surface 291 and the bottom surface 292 are opposed to each other. The top surface 291 faces the at least one first light-guiding element 24. The bottom surface 292 faces the second light-guiding element 27. The at least one first light-emitting element 25 is installed on the first surface 211 of the touch sensing circuit board 21. The at least one second light-emitting element 26 is installed on the top surface 291 of the light source circuit board 29. The at least one third light-emitting element 28 is installed on the bottom surface 292 of the light source circuit board 29.

As mentioned above, the touch sensing circuit board 21 has to process touch sensing signals. However, if too many light-emitting elements are installed on the touch sensing circuit board 21, the circuit of the touch sensing circuit board 21 is possibly abnormal, or the touch sensitivity of the touch sensing circuit board 21 is possibly deteriorated. In this embodiment, the luminous touch pad module 2a is additionally equipped with the light source circuit board 29. Some of the light-emitting elements are installed on the light source circuit board 29. Since the number of light-emitting elements installed on the touch sensing circuit board 21 is reduced, the circuit of the touch sensing circuit board 21 is normal, and the touch sensitivity of the touch sensing circuit board 21 is enhanced.

Figure 9:
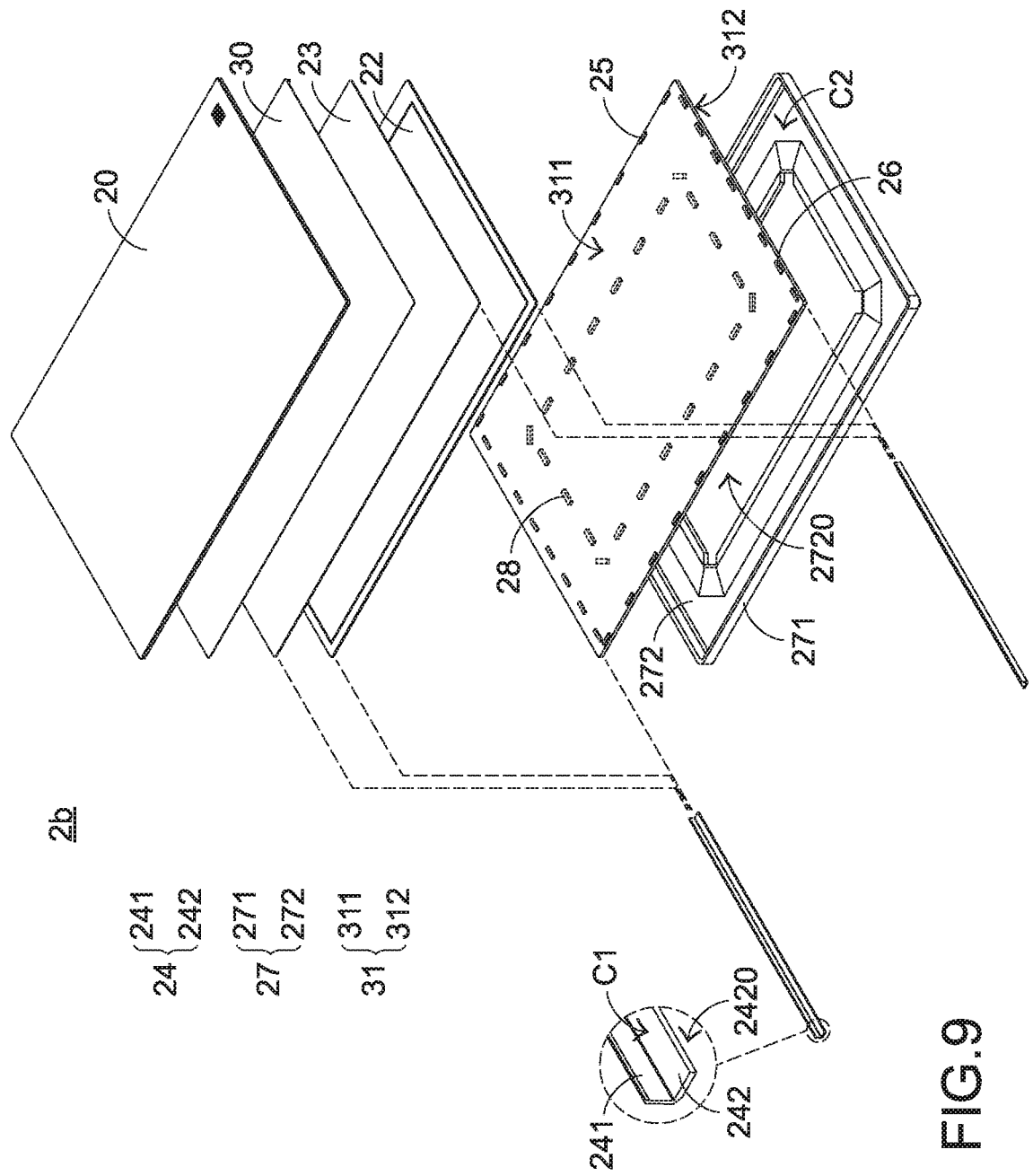
FIG. 9 is a schematic exploded view illustrating the luminous touch pad module according to a third embodiment of the present invention.
Figure 10:
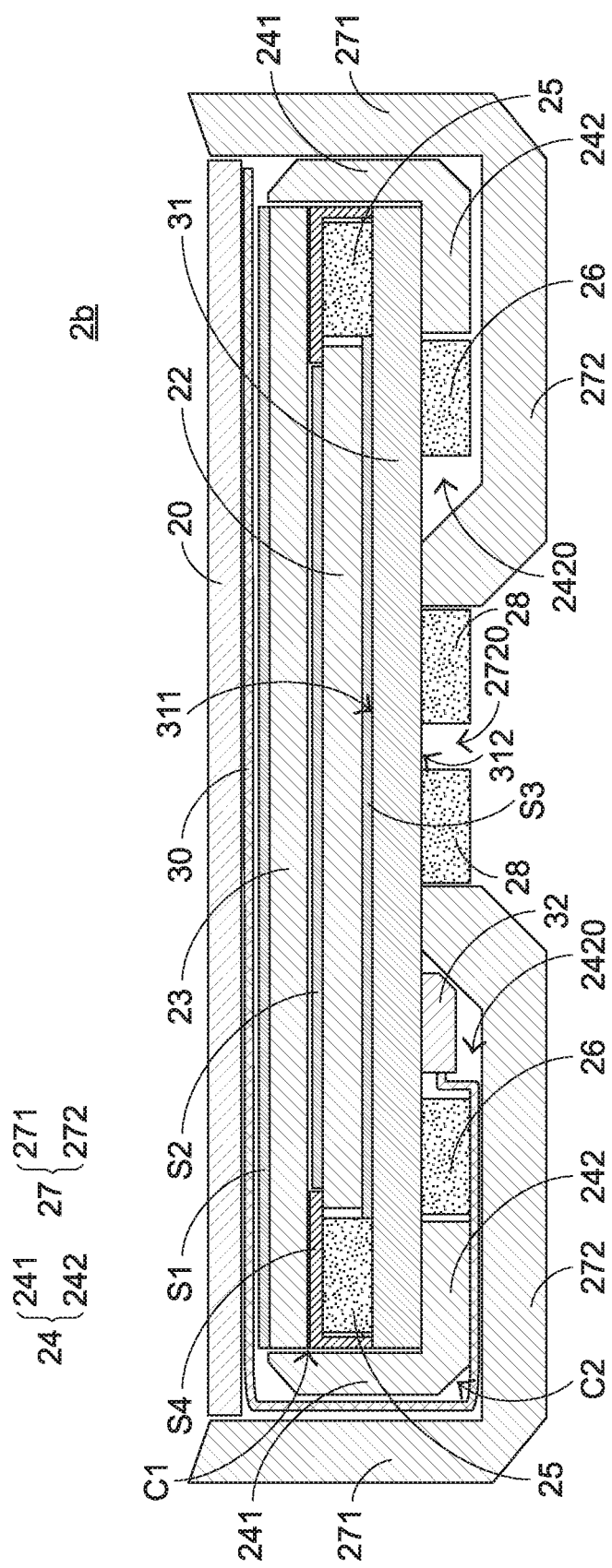
FIG. 10 is a schematic cross-sectional view illustrating the stack structure of the luminous touch pad module as shown in FIG. 9.

FIG. 9 is a schematic exploded view illustrating the luminous touch pad module according to a third embodiment of the present invention. FIG. 10 is a schematic cross-sectional view illustrating the stack structure of the luminous touch pad module as shown in FIG. 9.

The structures of the luminous touch pad module 2b of this embodiment are similar to the structures of the luminous touch pad module 2 as shown in FIGS. 2, 3 and 4. In comparison with the luminous touch pad module 2, the luminous touch pad module 2b of this embodiment further comprises a flexible touch sensing circuit board 30 and a printed circuit board 31 to replace the touch sensing circuit board 21 of the luminous touch pad module 2. In this embodiment, the printed circuit board 31 is located under the touch member 20. The first light guide plate 22 is arranged between the touch member 20 and the printed circuit board 31. The second light guide plate 23 is arranged between the touch member 20 and the first light guide plate 22. The flexible touch sensing circuit board 30 is arranged between the touch member 20 and the second light guide plate 23. The second light guide plate 23 is arranged between the flexible touch sensing circuit board 30 and the first light guide plate 22. In addition, the flexible touch sensing circuit board 30 is electrically connected with the printed circuit board 31. In this embodiment, the flexible touch sensing circuit board is made of a light-transmissible material. It is noted that the material of the flexible touch sensing circuit board 30 is not restricted.

The at least one first light-emitting element 25 is installed on the printed circuit board 31. In addition, the at least one first light-emitting element 25 is aligned with the first light guide plate 22. The at least one second light-emitting element 26 is located under the printed circuit board 31. In addition, the second light-emitting element 26 is aligned with the first light-guiding element 24. The first light-guiding element 24 is arranged around the printed circuit board 31, the first light guide plate 22, the second light guide plate 23 and the at least one first light-emitting element 25. The second light-guiding element 27 is arranged around the touch member 20, the first light-guiding element 24 and the flexible touch sensing circuit board 30. The at least one third light-emitting element 28 is located under the printed circuit board 31. In addition, the at least one third light-emitting element 28 is aligned with the second light-guiding element 27.

A first accommodation space C1 is defined by the lateral wall 241 and the bottom wall 242 of the first light-guiding element 24 collaboratively. The printed circuit board 31, the first light guide plate 22 and the second light guide plate 23 are disposed within the first accommodation space C1. The at least one second light-emitting element 26 is disposed within the first hollow portion 2420 of the bottom wall 242 of the first light-guiding element 24. In addition, the at least one second light-emitting element 26 is aligned with the bottom wall 242 of the first light-guiding element 24. A second accommodation space C2 is defined by the surrounding wall 271 and the base plate 272 of the second light-guiding element 27 collaboratively. The touch member 20, the printed circuit board 31, the first light guide plate 22, the second light guide plate 23, the first light-guiding element 24, the flexible circuit board 30, the at least one first light-emitting element 25 and the at least one second light-emitting element 26 are disposed within the second accommodation space C2. The at least one third light-emitting element 28 is disposed within the second opening 2720 of the base plate 272. In addition, the at least one third light-emitting element 28 is aligned with the base plate 272.

Please refer to FIGS. 9 and 10 again. In this embodiment, the printed circuit board 31 comprises a top surface 311 and a bottom surface 312. The top surface 311 and the bottom surface 312 are opposed to each other. The top surface 311 of the printed circuit board 31 is arranged between the first light guide plate 22 and the bottom surface 312 of the printed circuit board 31. The at least one first light-emitting element 25 is installed on the top surface 311 of the printed circuit board 31. In addition, the at least one first light-emitting element 25 is electrically connected with the printed circuit board 31. The at least one second light-emitting element 26 is installed on the bottom surface 312 of the printed circuit board 31. In addition, the at least one second light-emitting element 26 is electrically connected with the printed circuit board 31. The at least one third light-emitting element 28 is installed on the bottom surface 312 of the printed circuit board 31. In addition, the at least one third light-emitting element 28 is electrically connected with the printed circuit board 31. The at least one third light-emitting element 28 is located beside a side of the at least one second light-emitting element 26.

As shown in FIG. 10, the luminous touch pad module 2*b* further comprises an electrical connector 32. The electrical connector 32 is located under the printed circuit board 31. That is, the electrical connector 32 is installed on the bottom surface 312 of the printed circuit board 31. The flexible touch sensing circuit board 30 is electrically connected with the printed circuit board 31 through the electrical connector 32.

In this embodiment, the luminous touch pad module 2*b* is equipped with the flexible touch sensing circuit board 30 and the printed circuit board 31. Moreover, the flexible touch sensing circuit board 30 is extended to the region between the touch member 20 and the second light guide plate 23. Due to this structural design, the sensitivity of performing the touch control operation on the touch member 20 is effectively enhanced.

Figure 11:
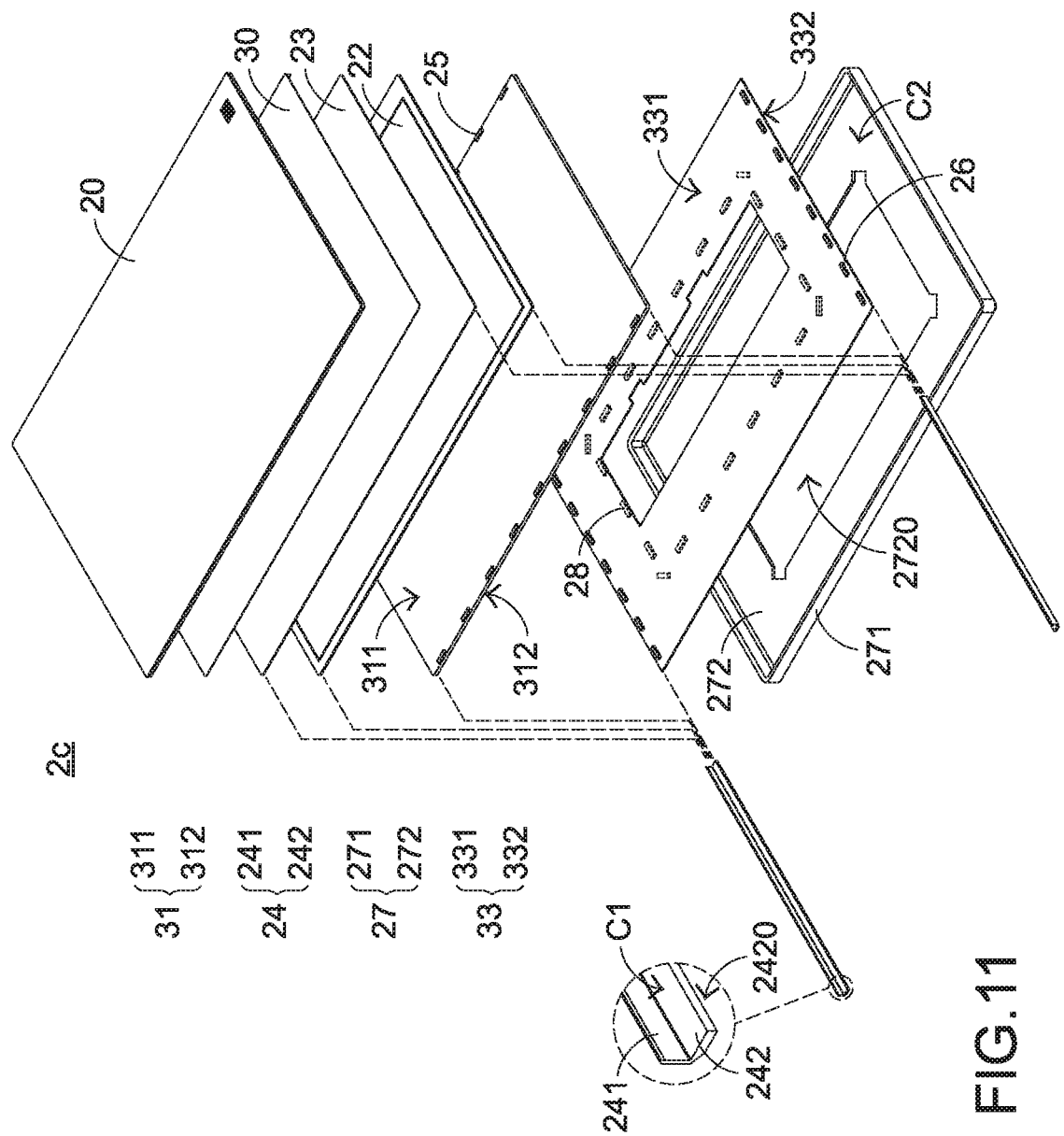
FIG. 11 is a schematic exploded view illustrating the luminous touch pad module according to a fourth embodiment of the present invention.
Figure 12:
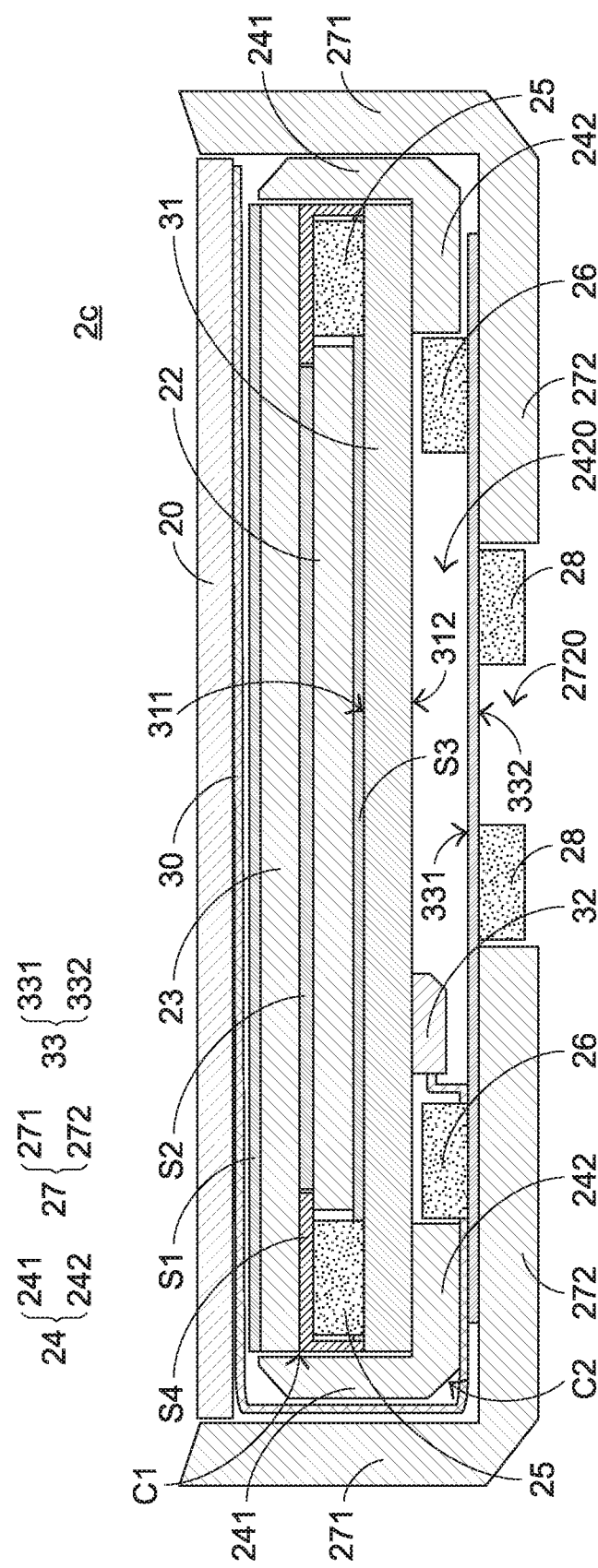
FIG. 12 is a schematic cross-sectional view illustrating the stack structure of the luminous touch pad module as shown in FIG. 11.

Please refer to FIGS. 11 and 12. FIG. 11 is a schematic exploded view illustrating the luminous touch pad module according to a fourth embodiment of the present invention. FIG. 12 is a schematic cross-sectional view illustrating the stack structure of the luminous touch pad module as shown in FIG. 11.

The structures of the luminous touch pad module 2*c* of this embodiment are similar to those of the luminous touch pad module 2*b* as shown in FIGS. 9 and 10. In comparison with the luminous touch pad module 2*b*, the luminous touch pad module 2*c* further comprises a light source circuit board 33. The at least one second light-emitting element 26 and the at least one third light-emitting element 28 are supported by the light source circuit board 33. The light source circuit board 33 is arranged between the first light-guiding element 24 and the second light-guiding element 27. The at least one first light-emitting element 25 is installed on the top surface 311 of the printed circuit board 31. The at least one second light-emitting element 26 is installed on the top surface 331 of the light source circuit board 33. The at least one third light-emitting element 28 is installed on the bottom surface 332 of the light source circuit board 33.

In this embodiment, the printed circuit board 31 has to process touch sensing signals from the flexible touch sensing circuit board 30. However, if too many light-emitting elements are installed on the printed circuit board 31, the circuit of the flexible touch sensing circuit board 30 is possibly abnormal, or the touch sensitivity of the flexible touch sensing circuit board 30 is possibly deteriorated. In this embodiment, the luminous touch pad module 2*c* is additionally equipped with the light source circuit board 33. Some of the light-emitting elements are installed on the light source circuit board 33. Since the number of light-emitting elements installed on the printed circuit board 31 is reduced, the circuit of the flexible touch sensing circuit board 30 is normal, and the touch sensitivity of the flexible touch sensing circuit board 30 is enhanced.

Figure 13:
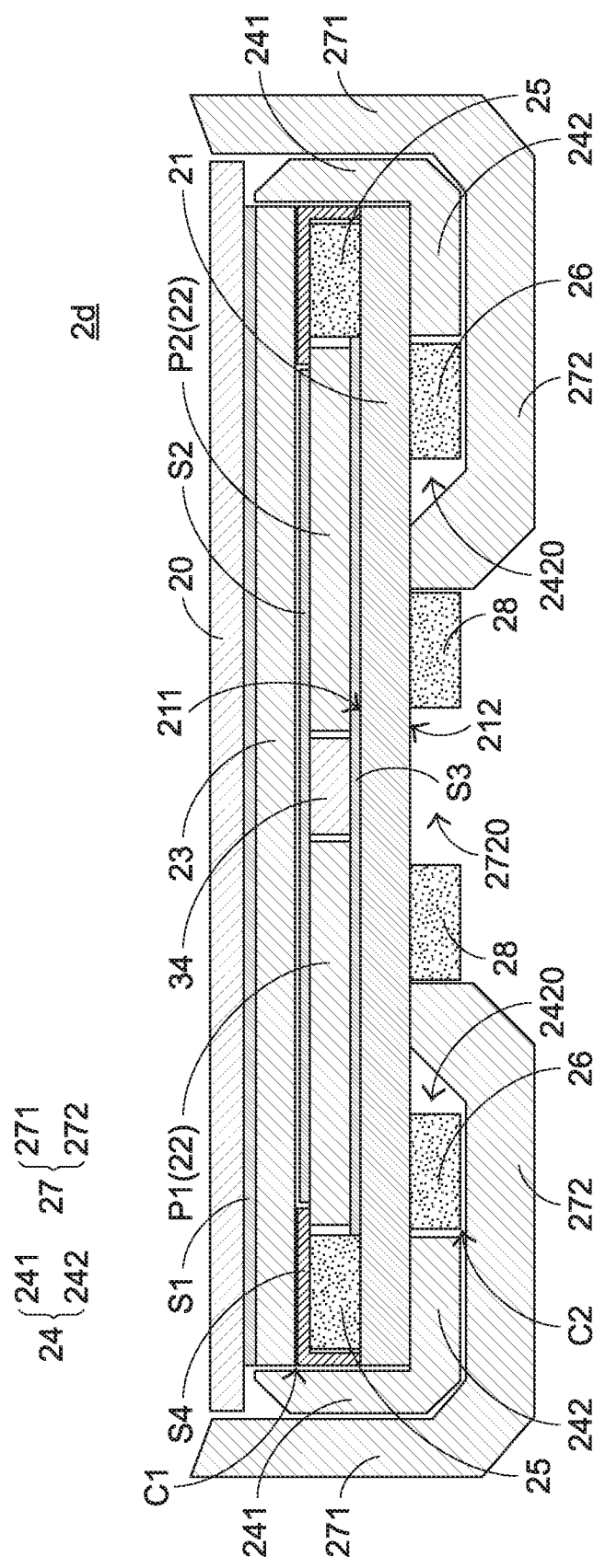
FIG. 13 is a schematic exploded view illustrating a luminous touch pad module according to a fifth embodiment of the present invention.

FIG. 13 is a schematic exploded view illustrating a luminous touch pad module according to a fifth embodiment of the present invention.

The structures of the luminous touch pad module 2*d* of this embodiment are similar to the structures of the luminous touch pad module 2 as shown in FIGS. 2, 3 and 4. In comparison with the luminous touch pad module as shown in FIGS. 2, 3 and 4, the luminous touch pad module 2*d* of this embodiment further comprises a light blocking structure 34. The light blocking structure 34 is installed on the first light guide plate 22. The first light guide plate 22 is divided into a first light-guiding part P1 and a second light-guiding part P2 by the light blocking structure 34. The first light-guiding part P1 and the second light-guiding part P2 represent different luminous regions. The at least one first light-emitting element 25 on the first side of the first surface 211 of the touch sensing circuit board 21 is aligned with the first light-guiding part P1 of the first light guide plate 22. The at least one first light-emitting element 25 on the second side of the first surface 211 of the touch sensing circuit board 21 is aligned with the second light-guiding part P2 of the first light guide plate 22.

The user may operate the notebook computer to selectively drive the first light-emitting element 25 in the first light-guiding part P1 of the first light guide plate 22 or the first light-emitting element 25 in the second light-guiding part P2 of the first light guide plate 22 to emit the light beam. Consequently, the partition illumination efficacy of the luminous touch pad module 2*d* can be achieved.

In the above embodiment, the first light guide plate 22 is divided into the first light-guiding part P1 and the second light-guiding part P2 by the light blocking structure 34. It is noted that numerous modifications and alterations may be made while retaining the teachings of the invention. For example, in some other embodiments, the first light guide plate 22 is divided into at least three luminous regions by the light blocking structure 34. In addition, the shapes of the luminous regions that are formed in the first light guide plate 22 and defined by the light blocking structure 34 are not restricted.

From the above descriptions, the present invention provides the luminous touch pad module. Due to the cooperation of the first light guide plate and the at least one first light-emitting element, the cooperation of the first light-guiding element, the second light guide plate and the second light-emitting element and the cooperation of the second light-guiding element and the at least one third light-emitting element, the problem of resulting in a non-functional area of the luminous touch pad module at the region corresponding to the installation position of the light-emitting element will be overcome. Consequently, a bright light ring surrounding the periphery region of the virtual numeric keypad can be displayed on the luminous touch pad module, and a multilayered luminous effect can be provided.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A luminous touch pad module, comprising:
a touch member;
a touch sensing circuit board located under the touch member;
a first light guide plate arranged between the touch member and the touch sensing circuit board;
a second light guide plate arranged between the touch member and the first light guide plate;
at least one first light-emitting element located over the touch sensing circuit board, wherein the at least one first light-emitting element is aligned with the first light guide plate;
a first light-guiding element arranged around the touch sensing circuit board, the first light guide plate, the second light guide plate and the at least one first light-emitting element; and at least one second light-emitting element located under the touch sensing circuit board, wherein the at least one second light-emitting element is aligned with the first light-guiding element, wherein a light beam emitted by the at least one first light-emitting element is transmitted to the touch member through the first light guide plate, and a light beam emitted by the at least one second light-emitting element is transmitted to the touch member through the first light-guiding element and the second light guide plate sequentially.

2. The luminous touch pad module according to claim 1, wherein the first light-guiding element comprises a lateral wall and a bottom wall, wherein the lateral wall of the first light-guiding element is arranged around the touch sensing circuit board, the first light guide plate, the second light guide plate and the at least one first light-emitting element, the bottom wall of the first light-guiding element is located under the touch sensing circuit board, the bottom wall of the first light-guiding element comprises a first hollow portion, and the lateral wall of the first light-guiding element is extended from an outer edge of the bottom wall of the first light-guiding element and extended in a direction toward the touch member, wherein a first accommodation space is defined by the lateral wall and the bottom wall of the first light-guiding element collaboratively, and the first accommodation space is in communication with the first hollow portion, wherein the touch sensing circuit board, the first light guide plate, the second light guide plate and the at least one first light-emitting element are disposed within the first accommodation space, the at least one second light-emitting element is disposed within the first hollow portion, and the at least one second light-emitting element is aligned with the bottom wall of the first light-guiding element.

3. The luminous touch pad module according to claim 1, wherein the luminous touch pad module further comprises a second light-guiding element and at least one third light-emitting element, wherein the second light-guiding element is arranged around the touch member and the first light-guiding element, the at least one third light-emitting element is located under the touch sensing circuit board, and the at least one third light-emitting element is aligned with the second light-guiding element, wherein a light beam emitted by the at least one third light-emitting element is transmitted to a position near an outer edge of the touch member through the second light-guiding element.

4. The luminous touch pad module according to claim 3, wherein the second light-guiding element comprises a surrounding wall and a base plate, wherein the surrounding wall of the second light-guiding element is arranged around the touch member and the first light-guiding element, the base plate of the second light-guiding element has a second hollow portion, and the surrounding wall of the second light-guiding element is extended from an outer edge of the base plate and extended to the position near the outer edge of the touch member, wherein a second accommodation space is defined by the surrounding wall and the base plate of the second light-guiding element collaboratively, and the second accommodation space is in communication with the second hollow portion, wherein the touch member, the touch sensing circuit board, the first light guide plate, the second light guide plate, the first light-guiding element, the at least one first light-emitting element and the at least one second light-emitting element are disposed within the second accommodation space, and the at least one third light-emitting element is disposed within the second hollow portion and aligned with the base plate of the second light-guiding element.

5. The luminous touch pad module according to claim 3, wherein the touch sensing circuit board comprises a first surface and a second surface, and the first surface and the second surface are opposed to each other, wherein the first surface of the touch sensing circuit board is arranged between the first light guide plate and the second surface of the touch sensing circuit board, the at least one first light-emitting element is installed on the first surface of the touch sensing circuit board, the at least one second light-emitting element is installed on the second surface of the touch sensing circuit board, and the at least one third light-emitting element is installed on the second surface of the touch sensing circuit board and located beside the at least one second light-emitting element.

6. The luminous touch pad module according to claim 3, wherein the luminous touch pad module further comprises a light source circuit board, wherein the light source circuit board is arranged between the first light-guiding element and the second light-guiding element, the light source circuit board comprises a top surface and a bottom surface, and the top surface and the bottom surface are opposed to each other, wherein the top surface of the light source circuit board faces the first light-guiding element, the bottom surface of the light source circuit board faces the second light-guiding element, the at least one second light-emitting element is installed on the top surface of the light source circuit board, the at least one third light-emitting element is installed on the bottom surface of the light source circuit board, and the at least one first light-emitting element is installed on the touch sensing circuit board.

7. The luminous touch pad module according to claim 1, wherein the luminous touch pad module further comprises a light blocking structure, wherein the light blocking structure is installed on the first light guide plate, and the first light guide plate is divided into a first light-guiding part and a second light-guiding part by the light blocking structure, wherein the at least one first light-emitting element comprises plural first light-emitting elements, at least one of the plural first light-emitting elements is aligned with the first light-guiding part of the first light guide plate, and others of the plural first light-emitting elements are aligned with the second light-guiding part of the first light guide plate.

8. A luminous touch pad module, comprising:
a touch member;
a printed circuit board located under the touch member;
a first light guide plate arranged between the touch member and the printed circuit board;
a second light guide plate arranged between the touch member and the first light guide plate;
a flexible touch sensing circuit board arranged between the touch member and the second light guide plate, wherein the flexible touch sensing circuit board is electrically connected with the printed circuit board;
at least one first light-emitting element located over the printed circuit board, wherein the at least one first light-emitting element is aligned with the first light guide plate;
a first light-guiding element arranged around the printed circuit board, the first light guide plate, the second light guide plate and the at least one first light-emitting element; and at least one second light-emitting element located under the printed circuit board, wherein the at least one second light-emitting element is aligned with the first light-guiding element, wherein a light beam emitted by the at least one first light-emitting element is transmitted to the touch member through the first light guide plate, and a light beam emitted by the at least one second light-emitting element is transmitted to the touch member through the first light-guiding element and the second light guide plate sequentially.

9. The luminous touch pad module according to claim 8, wherein the first light-guiding element comprises a lateral wall and a bottom wall, wherein the lateral wall of the first light-guiding element is arranged around the printed circuit board, the first light guide plate, the second light guide plate and the at least one first light-emitting element, the bottom wall of the first light-guiding element is located under the printed circuit board, the bottom wall of the first light-guiding element comprises a first hollow portion, and the lateral wall of the first light-guiding element is extended from an outer edge of the bottom wall of the first light-guiding element and extended in a direction toward the touch member, wherein a first accommodation space is defined by the lateral wall and the bottom wall of the first light-guiding element collaboratively, and the first accommodation space is in communication with the first hollow portion, wherein the printed circuit board, the first light guide plate and the second light guide plate are disposed within the first accommodation space, and the at least one second light-emitting element is disposed within the first hollow portion and aligned with the bottom wall of the first light-guiding element.

10. The luminous touch pad module according to claim 8, wherein the luminous touch pad module further comprises a second light-guiding element and at least one third light-emitting element, wherein the second light-guiding element is arranged around the touch member, the first light-guiding element and the flexible touch sensing circuit board, the at least one third light-emitting element is located under the printed circuit board, and the at least one third light-emitting element is aligned with the second light-guiding element, wherein a light beam emitted by the at least one third light-emitting element is transmitted to a position near an outer edge of the touch member through the second light-guiding element.

11. The luminous touch pad module according to claim 10, wherein the second light-guiding element comprises a surrounding wall and a base plate, wherein the surrounding wall of the second light-guiding element is arranged around the touch member the first light-guiding element and the flexible touch sensing circuit board, the base plate of the second light-guiding element has a second hollow portion, and the surrounding wall of the second light-guiding element is extended from an outer edge of the base plate and extended to the position near the outer edge of the touch member, wherein a second accommodation space is defined by the surrounding wall and the base plate of the second light-guiding element collaboratively, and the second accommodation space is in communication with the second hollow portion, wherein the touch member, the printed circuit board, the first light guide plate, the second light guide plate, the first light-guiding element, the flexible touch sensing circuit board, the at least one first light-emitting element and the at least one second light-emitting element are disposed within the second accommodation space, and the at least one third light-emitting element is disposed within the second hollow portion and aligned with the base plate of the second light-guiding element.

12. The luminous touch pad module according to claim 10, wherein the printed circuit board comprises a top surface and a bottom surface, and the top surface and the bottom surface are opposed to each other, wherein the top surface of the printed circuit board is arranged between the first light guide plate and the bottom surface of the printed circuit board, the at least one first light-emitting element is installed on the top surface of the printed circuit board, the at least one second light-emitting element is installed on the bottom surface of the printed circuit board, and the at least one third light-emitting element is installed on the bottom surface of the printed circuit board and located beside the at least one second light-emitting element.

13. The luminous touch pad module according to claim 10, wherein the luminous touch pad module further comprises a light source circuit board, wherein the light source circuit board is arranged between the first light-guiding element and the second light-guiding element, the light source circuit board comprises a top surface and a bottom surface, and the top surface and the bottom surface are opposed to each other, wherein the top surface of the light source circuit board faces the first light-guiding element, the bottom surface of the light source circuit board faces the second light-guiding element, the at least one second light-emitting element is installed on the top surface of the light source circuit board, the at least one third light-emitting element is installed on the bottom surface of the light source circuit board, and the at least one first light-emitting element is installed on the printed circuit board.

14. The luminous touch pad module according to claim 8, wherein the luminous touch pad module further comprises an electrical connector, wherein the electrical connector is located under the printed circuit board, and the flexible sensing circuit board is electrically connected with the printed circuit board through the electrical connector.

15. The luminous touch pad module according to claim 8, wherein the flexible touch sensing circuit board is made of a light-transmissible material.

\* \* \* \* \*